(12) United States Patent
Joshi

(10) Patent No.: US 12,228,170 B1
(45) Date of Patent: Feb. 18, 2025

(54) COUPLING APPARATUS

(71) Applicant: Shailendra Joshi, Ho Ho Kus, NJ (US)

(72) Inventor: Shailendra Joshi, Ho Ho Kus, NJ (US)

( * ) Notice: Subject to any disclaimer, the term of this patent is extended or adjusted under 35 U.S.C. 154(b) by 614 days.

(21) Appl. No.: 17/235,315

(22) Filed: Apr. 20, 2021

(51) Int. Cl.
F16C 11/06 (2006.01)

(52) U.S. Cl.
CPC ... F16C 11/0614 (2013.01); *Y10T 403/32196* (2015.01)

(58) Field of Classification Search
CPC ... F16C 11/06; F16C 11/0614; F16C 11/0661; Y10T 403/32196; Y10T 403/32311; Y10T 403/32319; Y10T 403/32631; Y10T 403/32647; Y10T 403/32663
See application file for complete search history.

(56) References Cited

U.S. PATENT DOCUMENTS

| | | | | |
|---|---|---|---|---|
| 892,105 A * | 6/1908 | White | ............ | F16L 3/202 248/62 |
| 2,513,637 A * | 7/1950 | Herreshoff | ............ | F16C 11/069 92/130 R |
| 3,841,769 A * | 10/1974 | Bowerman | ............ | F16C 11/106 248/478 |
| 4,617,001 A * | 10/1986 | Parein | ............ | A63H 33/105 59/900 |
| 4,620,813 A * | 11/1986 | Lacher | ............ | F16C 11/106 403/93 |
| 5,109,321 A * | 4/1992 | Maglica | ............ | F21V 21/145 700/86 |
| 5,478,039 A * | 12/1995 | Wright | ............ | F16C 11/06 248/304 |
| 5,567,789 A * | 10/1996 | Manzouji | ............ | C08G 77/08 528/21 |
| 7,008,135 B2 * | 3/2006 | Wisler | ............ | F16C 11/0623 403/143 |
| 7,017,877 B2 * | 3/2006 | Melton | ............ | F16B 45/00 248/304 |
| 7,533,712 B2 * | 5/2009 | Whittemore | ............ | E04G 21/243 248/200.1 |

(Continued)

FOREIGN PATENT DOCUMENTS

| | | | | |
|---|---|---|---|---|
| GB | 568030 A * | 3/1945 | ............ | F16C 11/06 |
| WO | WO-2011141161 A2 * | 11/2011 | ............ | B25G 3/38 |

*Primary Examiner* — Amber R Anderson
*Assistant Examiner* — Kevin J Baynes
(74) *Attorney, Agent, or Firm* — Gulf Coast Intellectual Property Group

(57) ABSTRACT

A coupling apparatus that is configured to provide a movable connection between at least two support members wherein the coupling apparatus can be deployed as part of devices in a plurality of applications. The present invention includes a housing wherein the housing is oval in shape having a first end and a second end. The opposing sides of the housing are formed with openings wherein the openings are substantially the size of the opposing sides. A top wall and bottom wall are present in the housing having apertures formed in the center thereof. Disposed within the interior volume of the housing is a spherical member. The spherical member is movable between a plurality of fixed positions through manipulation of the housing, specifically applying an inward force to the ends of the housing. Support elements are present on the housing and spherical member that are operable to couple to a device.

5 Claims, 3 Drawing Sheets

(56) References Cited

U.S. PATENT DOCUMENTS

| | | | | |
|---|---|---|---|---|
| 8,485,706 | B2* | 7/2013 | Chien | B60Q 1/076 |
| | | | | 403/315 |
| 9,327,637 | B2* | 5/2016 | Kondo | B60Q 1/0683 |
| 9,663,153 | B2* | 5/2017 | Clark | B60R 9/05 |
| 2009/0196682 | A1* | 8/2009 | Kuhlman | F16C 11/06 |
| | | | | 403/133 |
| 2011/0036960 | A1* | 2/2011 | Li | F16C 11/106 |
| | | | | 248/288.11 |

* cited by examiner

COUPLING APPARATUS

FIELD OF THE INVENTION

The present invention relates generally to movable couplers, more specifically but not by way of limitation, a coupling apparatus that can be employed in a plurality of applications such as but not limited to electronic device holders, medical equipment and toys wherein the coupling apparatus of the present invention provides rotatable positioning to alternate intermediate a fixed setting.

BACKGROUND

Mechanical couplers are well known in the art and are utilized in a plurality of applications. For various applications it is desirable to facilitate a mechanical coupling between two elements wherein the two elements can be moved and/or adjusted as needed so the overall device can perform its intended function. By way of example but not limitation, electronic devices such as but not limited to cellular phones are often placed in cradles in vehicles and the like. These cradles provide a support member that secures the phone and further provide the ability to movably adjust the position of the cradle in order to place the screen in a desired position.

The aforementioned will utilize conventional movable joints such as but not limited to a ball joint or a swivel joint. While the existing technology executes its intended function these existing devices are limited in scope when it comes to broader applications. Additionally, some existing devices require tools for movable adjustment, which can be undesirable or inconvenient for a user.

It is intended within the scope of the present invention to provide a mechanical coupling device that provides a movable connection between at least two support members wherein the present invention provides a movable connection utilizing a spherical member operably coupled with a unique housing.

SUMMARY OF THE INVENTION

It is the object of the present invention to provide a mechanical coupler that is operable to provide a movable connection between two support members wherein the present invention includes a housing.

Another object of the present invention is to provide a coupler configured to facilitate an adjustable coupling between two elements so as to alternate between fixed positioning therebetween wherein the housing of the present invention includes an outer wall that is oval in shape.

A further object of the present invention is to provide a mechanical coupler that is operable to provide a movable connection between two support members wherein the housing includes a first end and a second end that are arcuate in form.

Still another object of the present invention is to provide a coupler configured to facilitate an adjustable coupling between two elements so as to alternate between fixed positioning therebetween wherein the housing of the present invention includes a first side and a second side wherein the first side includes an opening and the second side has an opening.

An additional object of the present invention is to provide a mechanical coupler that is operable to provide a movable connection between two support members wherein the housing of the present invention includes a top and a bottom wherein the top and the bottom further include apertures.

Yet a further object of the present invention is to provide a coupler configured to facilitate an adjustable coupling between two elements so as to alternate between fixed positioning therebetween that further includes a spherical member wherein the spherical member is disposed within the interior volume of the housing.

Another object of the present invention is to a provide a mechanical coupler that is operable to provide a movable connection between two support members wherein the spherical member includes an outer surface having a texture formed thereon.

An alternate object of the present invention is to provide a coupler configured to facilitate an adjustable coupling between two elements so as to alternate between fixed positioning therebetween wherein the spherical member includes a support member secured thereto extending outward therefrom.

Still a further object of the present invention is to provide a mechanical coupler that is operable to provide a movable connection between two support members wherein the housing includes a support member secured to the first end thereof.

An additional object of the present invention is to provide a coupler configured to facilitate an adjustable coupling between two elements so as to alternate between fixed positioning therebetween wherein alternative embodiments of the present invention present invention provide for various configurations and quantities of support members operably coupled to the housing and spherical member.

An additional object of the present invention is to provide a mechanical coupler that is operable to provide a movable connection between two support members wherein the present invention is provided in alternate sizes.

To the accomplishment of the above and related objects the present invention may be embodied in the form illustrated in the accompanying drawings. Attention is called to the fact that the drawings are illustrative only. Variations are contemplated as being a part of the present invention, limited only by the scope of the claims.

BRIEF DESCRIPTION OF THE DRAWINGS

A more complete understanding of the present invention may be had by reference to the following Detailed Description and appended claims when taken in conjunction with the accompanying Drawings wherein:

DETAILED DESCRIPTION

Figure 1:
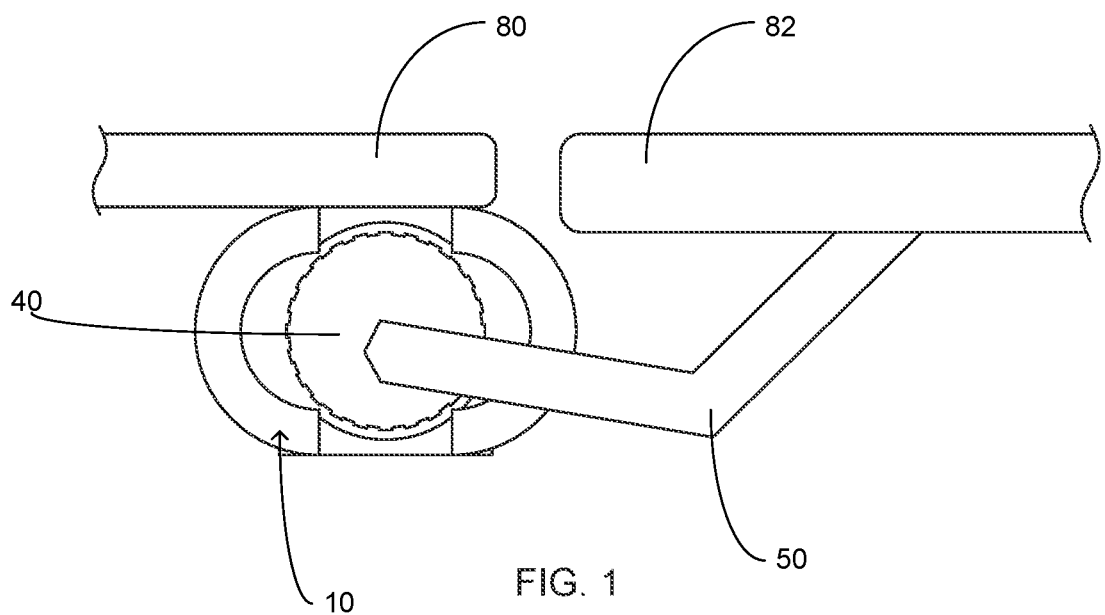
FIG. 1 is a side view of the present invention incorporated into an exemplary embodiment.

Referring now to the drawings submitted herewith, wherein various elements depicted therein are not necessarily drawn to scale and wherein through the views and figures like elements are referenced with identical reference numerals, there is illustrated a coupling apparatus 100 constructed according to the principles of the present invention.

An embodiment of the present invention is discussed herein with reference to the figures submitted herewith. Those skilled in the art will understand that the detailed description herein with respect to these figures is for explanatory purposes and that it is contemplated within the scope of the present invention that alternative embodiments are plausible. By way of example but not by way of limitation, those having skill in the art in light of the present teachings of the present invention will recognize a plurality of alternate and suitable approaches dependent upon the needs of the particular application to implement the functionality of any given detail described herein, beyond that of the particular implementation choices in the embodiment described herein. Various modifications and embodiments are within the scope of the present invention.

It is to be further understood that the present invention is not limited to the particular methodology, materials, uses and applications described herein, as these may vary. Furthermore, it is also to be understood that the terminology used herein is used for the purpose of describing particular embodiments only, and is not intended to limit the scope of the present invention. It must be noted that as used herein and in the claims, the singular forms "a", "an" and "the" include the plural reference unless the context clearly dictates otherwise. Thus, for example, a reference to "an element" is a reference to one or more elements and includes equivalents thereof known to those skilled in the art. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

References to "one embodiment", "an embodiment", "exemplary embodiments", and the like may indicate that the embodiment(s) of the invention so described may include a particular feature, structure or characteristic, but not every embodiment necessarily includes the particular feature, structure or characteristic.

Referring now to the Figures submitted as a part hereof, the coupling apparatus 100 includes a housing 10. The housing 10 is oval in shape and is manufactured from a suitable durable material such as but not limited to plastic. The housing 10 includes a first end 11 and a second end 12. The first end 11 and second end 12 are arcuate in shape. The housing 10 is formed to have a first side 13 and a second side 14. The first side 13 include an opening 15 that is substantially the size of the first side 13. Similarly, the second side 14 includes an opening 16 that is substantially the size of the second side 14. The openings 15, 16 create a structure for the housing 10 that will provide the ability for the top wall 17 and bottom wall 18 to flex subsequent exposure to the first end 11 and second end 12 wherein the pressure thereon is inwards towards the housing 10. As will be discussed further herein, this provides the ability to adjust the coupling apparatus 100. It should be understood within the scope of the present invention that the housing 10 could be provided in alternate sizes in order to mateably engage different size spherical members 40.

Figure 5:
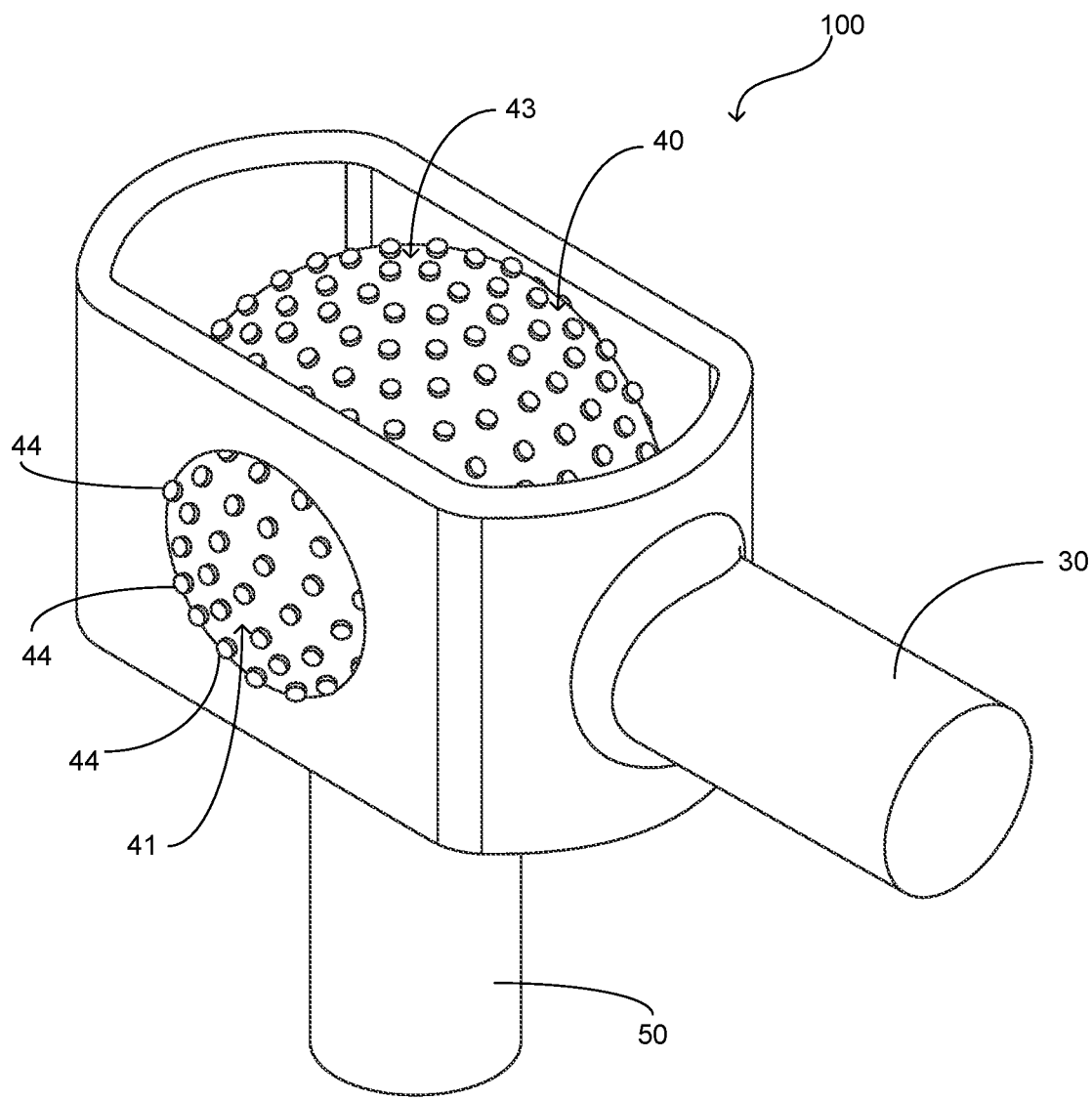
FIG. 5 is a assembled perspective view of the present invention.

Formed in the top wall 17 is aperture 20. Aperture 20 is annular in shape and is configured to releasably secure with the spherical member 40. It should be understood within the scope of the present invention that the aperture 20 could be formed in alternate sizes and shapes in order to achieve the desired functionality described herein. A second aperture 22 is formed in the bottom wall 18. The second aperture 22 is located on the bottom wall 18 opposite aperture 20 and in axial alignment therewith. The second aperture 22 functions in conjunction with the aperture 20 to releasably secure the spherical member 40 in a fixed position as shown herein in FIG. 5. During absence of pressure on the first end 11 and second end 12 of the housing 10, the housing 10 having the aperture 20 and second aperture 22 bias against the spherical member 40 so as to maintain in a fixed position. Inward pressure on the first end 11 and second end 12 results in an outward bowing of the top wall 17 and bottom wall 18 thus allowing the spherical member 40 to be moved to an alternate position.

The housing 10 includes a support member 30 secured the first end 11 thereof. The support member 30 provides a physical element that can either be secured to or integrally formed with other elements depending upon the application in which the coupling apparatus 100 is being deployed. While the support member 30 is illustrated herein being rod shaped, it should be understood within the scope of the present invention that the support member 30 could be provided in alternate sizes and shapes.

The spherical member 40 is movably coupled within the interior volume 9 of the housing 10. The spherical member 40 is sized so as to have a portion 41 thereof engage aperture 20 and second aperture 22 wherein the portion 41 protrudes slightly therethrough. The spherical member 40 is maintained in a fixed position as the top wall 17 and bottom wall 18 are biased thereagainst in conjunction with the aforementioned engagement of the aperture 20 and second aperture 22. The spherical member 40 includes and outer surface 43 wherein the outer surface 43 is textured with protrusions 44. The protrusions 44 are integrally formed with the outer surface 43 utilizing suitable techniques and function to enhance the engagement of the spherical member 40 with the housing 10 in order to maintain a fixed position of the spherical member 40. It should be understood within the scope of the present invention that the protrusions 44 could be present in various quantities and sizes. Furthermore, it should be understood within the scope of the present invention that the outer surface 43 of the spherical member 40 could be provided without protrusions 44.

The spherical member 40 includes a support member 50 operably coupled thereto. The support member 50 is secured to the spherical member 40 utilizing suitable techniques or can be integrally formed therewith. While the support member 50 is illustrated herein as being rod shaped, it should be understood within the scope of the present invention that the support member 50 could be provided in alternate shapes and sizes. The support member 50 is configured to be secured to an element of a device in which the coupling apparatus 100 is a part thereof so as to facilitate a movable coupling. As previously mentioned herein, the coupling apparatus 100 could be deployed as part of an electronics holder, medical equipment or toys.

Figure 2:
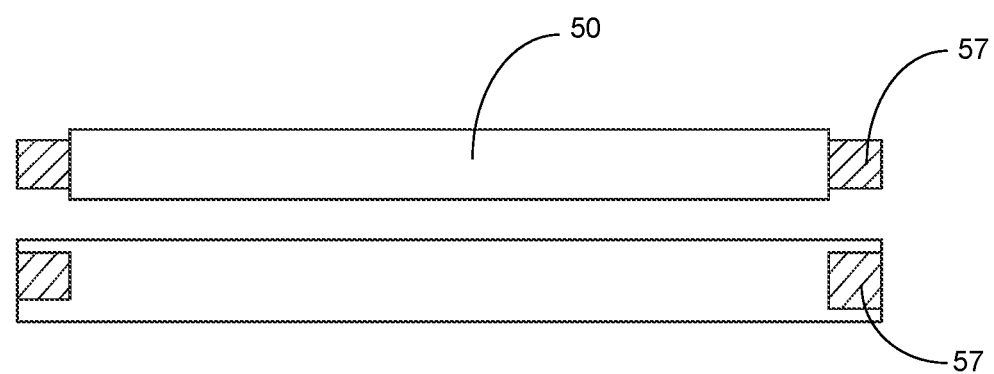
FIG. 2 is a side view of support members for an exemplary embodiment of the present invention.
Figure 3:
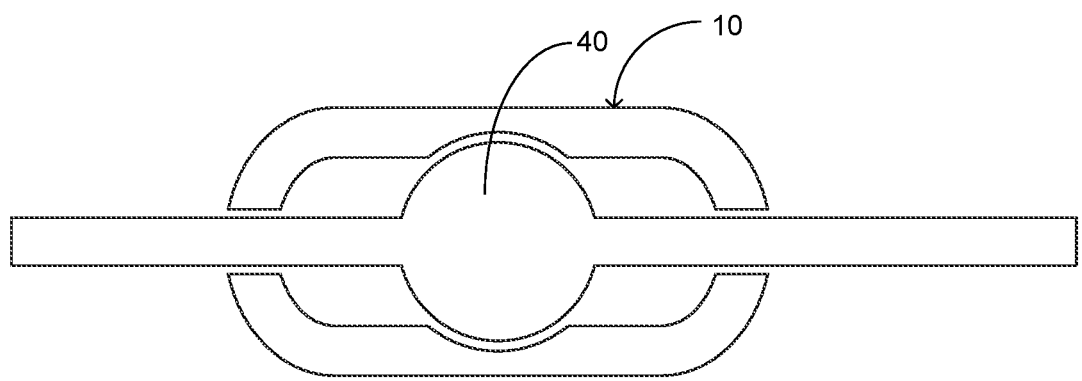
FIG. 3 is a side view of the present invention in a toy embodiment.
Figure 4:
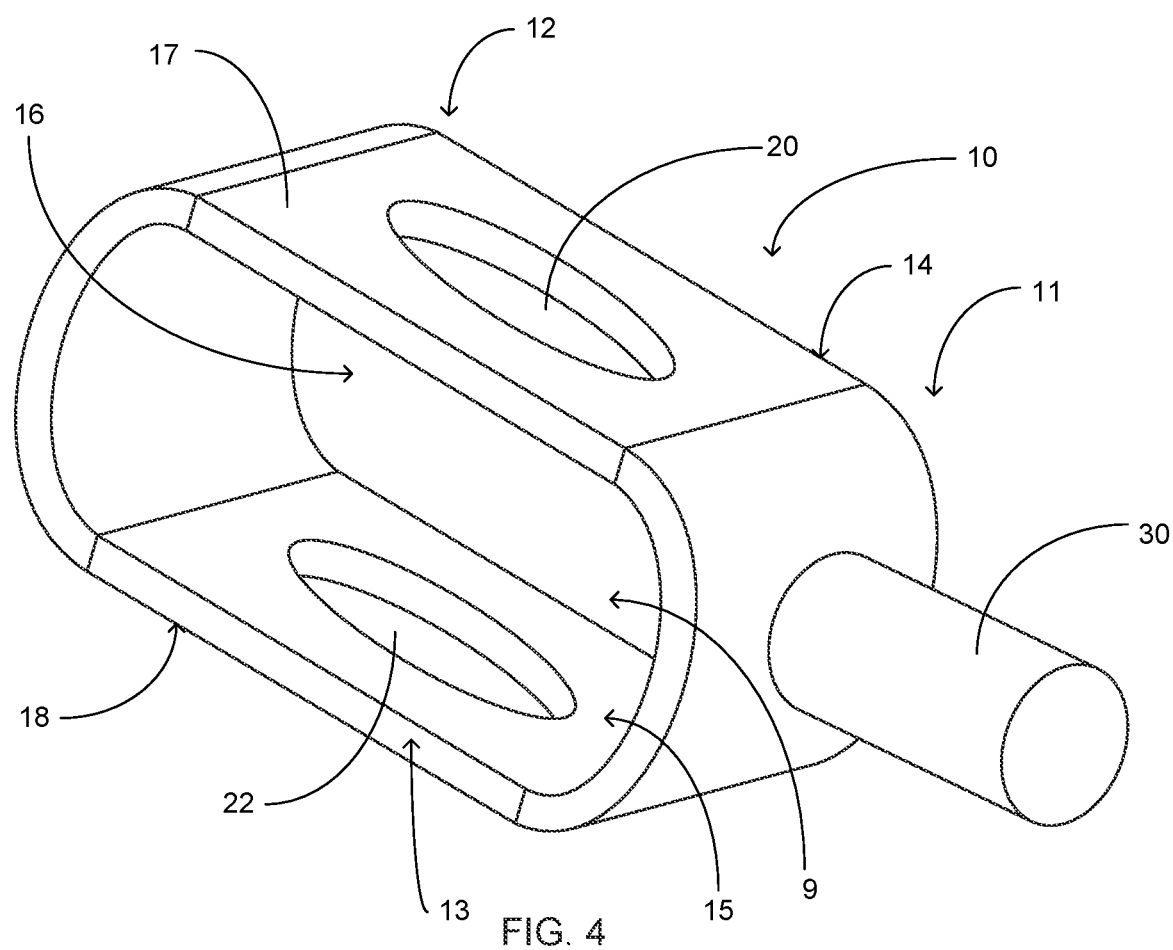
FIG. 4 is a perspective view of the housing of the present invention.

Illustrated herein in FIGS. 1 and 3 are exemplary alternative embodiments wherein the coupling apparatus 100 is a part thereof. In FIG. 1 the coupling apparatus 100 provides a hingeable and an angular movement capability between the first support plate 80 and second support plate 82. As seen in FIG. 1 the support member 50 is provided in an alternate embodiment for the device of which a portion is illustrated in FIG. 1. FIG. 3 shows an exemplary deployment of the coupling apparatus 100 wherein the spherical member 40 includes more than one support element 50 extending outward therefrom. Support elements are held in position and are further rotatably movably ensuing release of the biased pressure of the housing 10 on the spherical member 40. FIG. 1 and FIG. 3 are exemplary only and do not serve to provide any limitation of embodiments that the coupling apparatus 100 can be deployed as a part thereof. FIG. 2 is an exemplary illustration of support member 50 wherein the support members 50 are configured to be releasably secured utilizing keepers 57. It is contemplated within the scope of the present invention that the keepers 57 could be alternate types of fasteners such as but not limited to screws and threaded barrels.

In the preceding detailed description, reference has been made to the accompanying drawings that form a part hereof, and in which are shown by way of illustration specific embodiments in which the invention may be practiced. These embodiments, and certain variants thereof, have been described in sufficient detail to enable those skilled in the art to practice the invention. It is to be understood that other suitable embodiments may be utilized and that logical changes may be made without departing from the spirit or scope of the invention. The description may omit certain information known to those skilled in the art. The preceding description is, therefore, not intended to be limited to the specific forms set forth herein, but on the contrary, it is intended to cover such alternatives, modifications, and equivalents, as can be reasonably included within the spirit and scope of the invention.

What is claimed is:

1. A coupling apparatus that is configured to provide a movable connection between at least two elements of a device wherein the coupling apparatus comprises:
   a housing, said housing having a first end and a second end, said first end of said housing and said second end of said housing being longitudinally opposed on said housing, said housing being formed from a single contiguous wall member, said housing having a first side and a second side, said first side of said housing having an outer surface, said second side of said housing having an outer surface, said first side of said housing having an opening substantially equivalent in size to the first side, said second side of said housing having an opening substantially equivalent in size to the second side, said housing having a top wall and a bottom wall, said housing having a void between said top wall and said bottom wall, said top wall having a first aperture formed therein, said first aperture being centrally located on said top wall, said bottom wall having a second aperture, said second aperture being in axial alignment with said first aperture opposedly located across said void;
   a spherical member, said spherical member being disposed within the void of the housing, said spherical member being movable amongst a multitude of fixed positions within the void of the housing ensuing an inward force being applied to said first end and said second end of said housing, wherein the spherical member includes portions that protrude into the first aperture and the second aperture during absence of an inward force on said first end and said second end of said housing and wherein said portions extend beyond the outer surfaces of said first side and said second side of said housing; and
   wherein said top wall and said bottom wall have a width that is equivalent to or greater than a diameter of the spherical member so as to place said spherical member substantially within the void of said housing.

2. The coupling apparatus that is configured to provide a movable connection between at least two elements as recited in claim 1, wherein the spherical member includes a plurality of protrusions formed on an outer surface thereof, said protrusions operable to enhance engagement between the spherical member and said housing.

3. The coupling apparatus that is configured to provide a movable connection between at least two elements as recited in claim 2, wherein the housing is oval in shape with the first end and the second end being arcuate in form.

4. The coupling apparatus that is configured to provide a movable connection between at least two elements as recited in claim 3, and further including a first support element, said first support element being secured to said housing, said first support element extending outward from said housing.

5. The coupling apparatus that is configured to provide a movable connection between at least two elements as recited in claim 4, and further including a second support element, said second support element being secured to said spherical member, said second support element extending outward from said spherical member.

* * * * *